United States Patent [19]

Blackwell

[11] Patent Number: 5,073,457
[45] Date of Patent: Dec. 17, 1991

[54] REPOSITIONABLE ADHESIVE

[75] Inventor: Elmer Blackwell, St. Paul, Minn.

[73] Assignee: Minnesota Mining and Manufacturing Company, St. Paul, Minn.

[21] Appl. No.: 525,441

[22] Filed: May 17, 1990

Related U.S. Application Data

[63] Continuation-in-part of Ser. No. 272,878, Nov. 21, 1988, abandoned.

[51] Int. Cl.$^5$ ............................................. B32B 23/04
[52] U.S. Cl. ...................... 428/484; 428/485; 428/509; 428/503; 524/487; 524/488; 524/489; 525/227
[58] Field of Search ............... 524/487, 488, 489; 428/484, 485, 507, 509, 503; 525/227

[56] References Cited

U.S. PATENT DOCUMENTS

| 3,314,838 | 4/1967 | Erwin | 156/71 |
|---|---|---|---|
| 3,331,729 | 7/1967 | Danielson et al. | 161/162 |
| 3,691,140 | 9/1972 | Silver | 260/78.5 |
| 3,770,708 | 11/1973 | Knoepfel et al. | 260/80.73 |
| 3,857,731 | 12/1974 | Merrill et al. | 117/122 PA |
| 3,922,464 | 11/1975 | Silver et al. | 428/355 |
| 4,166,152 | 8/1979 | Baker et al. | 428/522 |
| 4,391,853 | 7/1983 | Pointon | 427/152 |
| 4,495,318 | 1/1985 | Howard | 524/375 |
| 4,629,663 | 12/1986 | Brown et al. | 428/343 |
| 4,631,308 | 12/1986 | Graham et al. | 524/487 |
| 4,783,354 | 11/1988 | Fagan | 428/40 |
| 4,874,804 | 10/1989 | Brady et al. | 524/487 |

*Primary Examiner*—Melvyn I. Marquis
*Attorney, Agent, or Firm*—Gary L. Griswold; Walter N. Kirn; Janice L. Dowdall

[57] ABSTRACT

Repositionable adhesives which display surprising latent permanent adhesive properties are described herein. These adhesives are comprised of acrylic pressure sensitive resins. These pressure-sensitive adhesive resins can be either solvent based or water based. In the case of a solvent-based adhesive system, paraffin wax is used, while in the water-based systems, latex emulsions of polyethylene are preferred.

12 Claims, No Drawings

REPOSITIONABLE ADHESIVE

BACKGROUND OF THE INVENTION

This application is a continuation-in-part of U.S. Ser. No. 07/272,878 filed Nov. 21, 1988, abandoned.

FIELD OF THE INVENTION

The present invention relates to pressure-sensitive adhesives having repositionable properties and latent permanent adhesive properties.

DESCRIPTION OF THE RELATED ART

Repositionable pressure-sensitive adhesives have been long sought after, and various types have become well known in the art.

Microspheres are known in the art to be useful in repositionable pressure-sensitive adhesive applications. Microsphere-based adhesives are thought to perform well in such applications at least in part due to their "self-cleaning" character, wherein substrate contaminants tend to be pushed aside and trapped between the microspheres as the adhesive is applied. Upon removal, the adhesive can then still present a relatively uncontaminated surface for reapplication to the substrate.

However, problems with microsphere loss, i.e., microsphere transfer to the substrate, and the resultant need for use of a primer or binder have been recognized in the art. Numerous references concern preparation and/or use of inherently tacky, elastomeric acrylate microspheres which are solid in nature. Such spheres and their use in repositionable aerosol adhesives are disclosed in U.S. Pat. No. 3,691,140 (Silver). These microspheres are prepared by aqueous suspension polymerization of alkyl acrylate monomers and ionic comonomers, e.g., sodium methacrylate, in the presence of an anionic emulsifier. It is disclosed that use of a water-soluble, substantially oil-insoluble ionic comonomer is critical to preventing coagulation or agglomeration of the microspheres.

U.S. Pat. No. 4,166,152 (Baker et al.) describes solid, inherently tacky (meth)acrylate microspheres which are prepared from non-ionic alkyl acrylate or methacrylate monomer(s) in the presence of both an emulsifier and an ionic suspension stabilizer having an interfacial tension sufficient to prevent microsphere agglomeration. Such microspheres are also disclosed in U.S. Pat. No. 4,495,318, (International Cube Corporation), where the preparative method involves the use of a non-ionic emulsifier. Both patents disclose utility as a "reusable adhesive". However, none of the above repositionable adhesives are capable of permanent adhesion if such is desired.

There have been adhesives described in the patent literature which do allow some degree of repositioning and temporary rebonding of the substrate (U.S. Pat. Nos. 3,770,708, 3,857,731, 3,922,464) as well as adhesive compositions which permit repositioning of graphic arts paste-ups and adhesives which permit resealing of containers (JP 55-79266 and JP 58-183775).

Aerosol spray adhesives have demonstrated commercial importance in the graphic arts for adhering paper to various substrates. Such adhesives have many favorable characteristics. They permit paper to be removed from the substrate to which it is adhered, without tearing; however, they do not always permit rebonding.

Another type of repositionable pressure-sensitive adhesive available contains hollow non-adhesive spheroidal particles. The adhesive coated article is placed into position and may be adjusted from place-to-place until one is satisfied with the placement. When the desired position is established, the sheet material can be adhered to the surface merely by applying sufficient pressure manually or by means of a roller to rupture the hollow spheres. Thus, a permanent bond is established between the sheet material and the bonding surface. These adhesives are described in U.S. Pat. Nos. 3,314,834 and 3,331,729, and are commercially available under the trade name of "Controltac" brand adhesive.

U.S. Pat. No. 4,783,354 (Fagen) discloses a repositionable sheet material coated with an adhesive composition containing a tacky pressure-sensitive adhesive, a wax, water and an emulsifier. The wax is present as a wax-in-water emulsion. The preferred weight ratio of pressure-sensitive adhesive to wax ranges from 10:1 to about 20:1. The composition is disclosed to maintain repositionable characteristics over extended periods of time.

In view of the above, an object of the invention is to provide a novel repositionable pressure-sensitive adhesive.

A further objective of this invention is to provide a pressure-sensitive adhesive which is not only repositionable, but also possesses latent permanent adhesive properties activated by passage of time, increased pressure or elevated temperature.

SUMMARY OF THE INVENTION

The adhesive composition provided by this invention comprises a petroleum wax, e.g., paraffin wax or a polyethylene or polypropylene wax emulsion blended with an acrylic adhesive. The wax in this mixture modifies the surface of the adhesive such that a repositionable or removable pressure-sensitive adhesive is obtained. Surprisingly, preferred adhesives of the invention also possess latent permanent adhesive properties; while they may be removed and readhered readily, they may also be applied in a specific manner so as to be nonremovable if such result is desired. More specifically, the present invention provides a pressure-sensitive adhesive composition having repositionable properties comprising:

a) at least one alkyl acrylate monomer, the alkyl groups of which have from 1 to about 14 carbon atoms, and b) a petroleum wax in an amount sufficient to impart repositionable properties to the adhesive, the adhesive also exhibiting latent permanent adhesive properties after contacting a substrate for from about 60 minutes to about 120 minutes. The permanent adhesive properties also may be activated by application of heat or pressure as well as by adhesion build after continued contact with the substrate.

Preferred adhesives of the invention comprise:

a) from about 70 parts to about 98 parts of an acrylic copolymer of monomers containing:
  (i) from about 60 to about 99 parts of an alkyl acrylate monomer, the alkyl groups of which have an average of 4 to 12 carbon atoms, and
  (ii) from about 1 part to about 40 parts of a monoethylenically unsaturated polar copolymerizable monomer, and b) petroleum wax selected from the group consisting of paraffin waxes and polyolefin emulsions.

The invention further provides a repositionable pressure-sensitive adhesive tape comprising such adhesive on a backing which is easily removed from paper, without delamination or tearing of the paper when it is applied lightly to the surface of the paper. Upon firm impression, e.g., rubbing, or upon warming the tape to at least 50° C., the wax flows into the fibers of the paper causing the formation of a permanent bond.

The following terms have these meanings when used herein.

1. The term "petroleum wax" means a wax selected from low molecular weight petroleum waxes, i.e. a paraffin wax, a microcrystalline wax, or a polyolefin emulsion wax.

2. The terms "repositionable" and "removable" are used interchangeably, and mean that an adhesive has the ability to be repeatedly adhered and removed from a substrate without substantial loss of adhesion capability.

3. The term "latent" means that which is not immediately apparent, as in "latent permanent adhesive properties" which would not be obvious when such adhesive was being used in a repositionable fashion, i.e., not having been applied in a manner which would cause the wax to flow into the fibers of the paper, resulting in permanent adhesion.

DETAILED DESCRIPTION OF THE INVENTION

The acrylic copolymers useful in removable pressure-sensitive adhesives of the invention constitute from about 60 to about 99 parts per hundred resin (phr) of the pressure-sensitive adhesive compositions of the invention. The acrylic copolymers contain at least one alkyl acrylate monomer, preferably a monofunctional unsaturated acrylate ester of non-tertiary alkyl alcohol, the molecules of which have from about 4 to about 14 carbon atoms. Such monomers include, e.g., isooctyl acrylate, 2-ethyl hexyl acrylate, isononyl acrylate, decyl acrylate, dodecyl acrylate, butyl acrylate, and hexyl acrylate. The acrylic polymers preferably contain from about 60 to about 90 parts of the alkyl acrylate monomer. The alkyl acrylate monomers may be polymerized with one or more polar copolymerizable monomers.

Polarity, or hydrogen-bonding ability, is frequently described by the use of terms such as "poorly", "moderately", and "strongly". References explaining the use of these and other solubility terms include "Solvents", Paint Testing Manual, 13th Ed., Seward, G. G., Editor, American Society for Testing and Materials, Phila., Pa., 1972, and "A Three-Dimensional Approach to Solubility", Journal of Paint Technology, 38, No. 496, pp. 269-280.

The polar copolymerizable monomers are selected from strongly polar monomers such as acrylic acid, acrylamide, itaconic acid, hydroxyalkyl acrylates, or substituted acrylamides or moderately polar monomers such as N-vinyl-2-pyrrolidone, N-vinyl caprolactam, and acrylonitrile. Where strongly polar monomers are used, they preferably comprise from about 5 parts to about 15 parts of the acrylic copolymer. Where moderately polar monomers are used, they preferably comprise from about 20 to about 40 parts of the acrylic copolymer.

A water-based acrylic terpolymer may also be used as described in U. S. Pat. No. 4,629,663, (Brown et al.), incorporated herein by reference.

Useful waxes in adhesives of the invention come from the class of petroleum waxes as defined in the "Encyclopedia of Polymer Science and Technology," Volume 13, Copyright 1971, John Wiley & Sons, Inc. Preferred waxes are paraffin waxes and low molecular weight microcrystalline waxes, e.g., polyethylene or polypropylene waxes. Such polyolefin waxes are typically provided as emulsions.

Useful paraffin wax has a melt index between about 25° C. and about 80° C. If the melt index is too high, the paraffin is not compatible with the adhesive; if too low, it is a solid at room temperature, and therefore difficult to process.

Paraffin waxes useful in adhesives of the invention include microcrystalline waxes. Preferred paraffin waxes include SHELLWAX TM 100, 200, and 300, available commercially from Shell Oil Company. The numbers 100, 200 and 300 are designations indicating increasing melt points of the wax as determined by ASTM test method D-87. Paraffin waxes are useful in amounts of from about 0.3% to about 7%, preferably from about 0.3% to about 3%.

Also useful are water-based wax emulsions such as those available from Michelman Incorporated, and those available from Eastman Kodak Company under the trade name Epolene TM. Preferred emulsions include polyethylene wax emulsions and polypropylene wax emulsions. Such emulsions have a percentage of solids which ranges from about 25 to about 50 percent solids, with 30% to 35% being typical. Therefore, when such emulsions are used, the preferred amounts range from about 18% to about 50%.

Without wishing to be bound by theory, it is believed that the petroleum wax migrates to the surface of the adhesive, thus modifying the initial tack characteristics of the acrylic copolymers which are normally aggressively tacky and non-repositionable. This migration results in a lowered initial tack for adhesives of the invention. Thus, the adhesive may be removed, and reapplied when applied to the substrate lightly. However, when heat or increased pressure is applied, the petroleum wax is forced to migrate into the porous substrate, and the acrylic copolymer contacts the surface, causing a build in adhesion to the point of non-removability. This is especially effective when the substrate is fibrous, e.g., paper. The wax then flows into the fibers of the paper, allowing more of the acrylic copolymer to contact the paper, building adhesion.

Continued contact with the substrate over a period of time will also result in flow of the petroleum wax into the porous substrate, called "cold flow". Such flow slowly results in increased contact of the acrylic copolymer with the substrate, causing adhesion build. While the period of time required for permanent adhesion to result from continued contact without application of pressure or heat varies with the specific adhesive formulation used, and the type of substrate, the adhesive typically exhibits permanent adhesion after a period of between 30 minutes and 2 hours.

The repositionable pressure-sensitive adhesives of this invention are especially useful for applications in which a certain initial period of repositionability to the substrate is desired, followed by permanent adhesion. Typical applications include repositionable transparent tape, self-stick notepaper and stationary, envelopes, novelties and the like which may be formed into a stacked pad for convenient use.

In an especially preferred embodiment, the pressure-sensitive adhesives of the invention are coated onto the flap of an envelope which is then formed into a stackable pad of envelopes, adhesively bonded by the adhesive on the flap. The reverse of each envelope flap is coated with a release material which prevents the adhesive from building adhesion to form a permanent bond to the adjacent envelope in the stack. Materials useful as release materials include silicones.

The repositionable pressure-sensitive adhesives of this invention may be prepared by mixture of its major components, i.e., alkyl acrylate monomer, polar monomer, and petroleum wax. The adhesive/wax mixture is then coated onto a suitable backing material either from an organic solvent or a latex emulsion. The adhesive/wax mixture is applied to a suitable backing in any conventional manner, e.g., by knife coating, reverse roll, or Meyer bar coating. The resultant is then heated from about 65° C. to about 90° C. to remove any excess solvent or moisture.

The backing to which the pressure-sensitive adhesive is applied is preferably a film coating. Useful films include cellulose acetate and cellophane films as well as ethyl cellulose, plasticized vinyl acetate-vinyl chloride copolymers, terephthalic acid-ethylene glycol polyester resins, and the like. Nonwoven or woven backings may also be employed, including treated or untreated paper, cloth, wadding, and the like. Where the pressure-sensitive adhesive is selected in order to be transparent, a transparent pressure-sensitive adhesive tape is produced.

The backing may be given a preliminary adhesive priming coat if desired, although the adhesive herein described is found to become firmly adherently bonded to most backings even in the absence of such priming layer.

TEST PROCEDURES

The following tests were used to evaluate repositionable pressure-sensitive adhesives of the invention.

180° PEEL ADHESION

The adhesive layer to be tested is transferred onto aluminum foil such that, upon evaporation of the solvent, the weight of adhesive remaining is approximately 0.91 grams per 10.56 cm × 15.24 cm. Strips 15 cm long and 2.54 cm wide are cut from the tape and placed in contact with the substrate to which adhesion is to be determined. Substrates used are glass and paper. The glass is cleaned after each adhesive is tested using one wash of diacetone alcohol (technical grade) and three washes of heptane (analytical grade). The paper is used once. The liner is removed and using two passes of a 1.82 kg roller, the adhesive surface of the tape is forced into contact with the substrate. One end of the tape is doubled back on itself at 180°, the exposed portion of the substrate being clamped in the upper jaws of a tensile testing machine while the doubled-back end of the tape is clamped in the lower jaws. The jaws are then separated at a rate of 35.7 cm/minute, the force to effect separation being reported in g/cm width.

STATIC SHEAR

Two flat, rigid stainless steel plates are bonded together by a piece of an adhesive layer 1.27 cm × 2.5 cm. Before testing, a 1000-g weight rests over the bonded area for 15 minutes. Then the weight is hung from one of the plates while the other plate is held in a position tilted 2° from the vertical to insure against any peel forces. The time at which the weight falls is the "Static Shear Value". If no failure occurs, the test is discontinued at 10,000 minutes. Only cohesive failures are reported.

Shear adhesion to paper is a test modified from American Society of Test Methods, ASTM 3654, Procedure A, which utilizes stainless steel adhesion rather than paper adhesion.

The following examples are meant to be illustrative and should not be construed as limiting in any way. The invention is defined solely by the scope of the claims. All percents, parts and ratios herein are by weight unless specifically stated otherwise.

EXAMPLES

EXAMPLE 1

This adhesive was prepared by mixing 2.8 parts of the paraffin wax with 100 parts of heptane until the wax is dissolved. This mixture was then mixed with an equal amount of an acrylate adhesive having 95 parts isooctyl acrylate and 5 parts acrylic acid. This adhesive was then coated onto 32 micrometer thick brightened cellulose acetate film backing which had been primed with a standard primer, e.g., a chlorinated polypropylene resin available from Sumitomo Corporation of America, New York, N.Y., under the trade name of HARDLEN 13 LP TM. The adhesive was knife-coated onto 40 micrometer thick vinyl acetate film to a coating weight of 54 grams/sq meter.

The tape was tested for 180° Peel adhesion, and static shear, and the results reported in Tables I and II.

| SHELLWAX TM 100 | 2.8 grams |
|---|---|
| Heptane | 100 grams |
| Acrylate copolymer | 100 grams |

EXAMPLE 2

Example 2 was prepared by a process similar to that using 1 2 in Example 1 except that the adhesive was made grams of SHELLWAX TM 200, a paraffin having a higher melt index.

The tape was tested for 180° Peel adhesion, and shear, and the results reported in Tables I and II.

| SHELLWAX TM 200 | 1.2 grams |
|---|---|
| Heptane | 100 grams |
| Acrylate copolymer | 100 grams |

EXAMPLE 3

Example 3 was prepared by a process similar to that in Example 1 except that the adhesive was made using 0.8 grams of SHELLWAX TM 300, a paraffin having a higher melt index.

The tape was tested for 180° Peel adhesion, and shear, and the results reported in Tables I and II.

| SHELLWAX TM 300 | 0.8 grams |
|---|---|
| Heptane | 100 grams |
| 95/5 Acrylate copolymer | 100 grams |

As can be seen, SHELLWAX TM 300 has a high molecular weight (typically greater than 590).

The tape was tested for 180° Peel adhesion, and shear, and the results reported in Tables I and II.

EXAMPLE 4

Example 4 was prepared by a process similar to that in Example 1 except that a blend of three paraffins having varying melt indices was used.

The tape was tested for 180° Peel adhesion, and shear, and the results reported in Tables I and II.

| | |
|---|---|
| SHELLWAX TM 100 | 0.2 grams |
| SHELLWAX TM 200 | 0.2 grams |
| SHELLWAX TM 300 | 0.2 grams |
| Heptane | 50.0 grams |
| 95/5 Acrylic copolymer | 50.0 grams |

EXAMPLE 5

In the previous examples, the waxes were dissolved in heptane and then blended with the acrylic adhesive. A water-based adhesive was prepared by mixing 1606 grams of deionized water, 2.4 grams of sodium bicarbonate, 6.0 grams of sodium dodecyl benzene sulfonate, 20 grams of sodium styrene sulfonate, 1707 grams of isooctyl acrylate, 240 grams of N-tert-octyl acrylamide, and 33 grams of a 1% solution of tertiary dodecyl mercaptan in isooctyl acrylate in a 5000 ml split-resin flask fitted to allow a nitrogen purge. The purge was continued throughout the reaction. The flask and its contents were heated to 40° C., and a first initiator charge of 1.2 g of potassium persulfate and 0.4 grams sodium metabisulfate was added. Polymerization began after about 30 minutes. The temperature was held at 40° C. during the reaction period. Eight ml of a 5% aqueous solution of sodium meta-bisulfite was added five hours after the first initiator charge, and 12 ml were added 2 hours later. The emulsion was heated for 90 hours following the last charge to complete polymerization. The resulting latex had a Brookfield TM viscosity of 1348 centipoise at room temperature, using a #3 spindle at 30 rpm. This adhesive was then mixed with the polyethylene wax emulsion to a solids value of 44%. These coatings were coated on to a substrate at about 25 grams/square meter. The results are reported in Tables I and II.

| | |
|---|---|
| Acrylic copolymer | 100 grams |
| EPOLENE TM E-10 | 50 grams |

EXAMPLE 6

A wax modified adhesive transfer tape was also prepared by using the adhesive blend of Example 5. The adhesive blend was coated onto a silicone release liner available from the Daubert Paper Company to a coating weight of about 34 grams per square meter. This embodiment was used as a transfer adhesive to the back of an envelope flap. Surprisingly the adhesive adheres tenaciously to the envelope flap while remaining repositionable to the envelope backing. With sufficient pressure to the envelope flap a permanent bond may be effected. Additional applications of this embodiment may be found in the packaging industries as repositionable labels or in the printing and publishing industries where extensive use of repositionable adhesives are used for the composition of art work and text paste-ups.

The tape was tested for 180° Peel adhesion, and shear, and the results reported in Tables I and II.

Three controls were also tested for peel adhesion and shear. A repositionable adhesive based on acrylic microspheres according to U.S. Pat. No. 3,691,140 was coated onto an acetate backing, and the results are shown as tape 6 in Table I. The second control consisted of commercially available Magic TM transparent tape, a permanent attachment tape. Finally, the third control was the pressure-sensitive adhesive acrylic copolymer described in Example 1 with no wax added thereto.

TABLE I

| Tape - Description | Initial Adhesion (oz/in.) | Heated Adhesion (oz/in.) |
|---|---|---|
| 1. Example 1 (SHELLWAX TM 200) | 12 | 39 |
| 2. Example 2 (SHELLWAX TM 100) | 20 | 40 |
| 3. Example 3 (SHELLWAX TM 300) | 10 | 30 |
| 4. Example 4 (Blend of waxes) | 4 | 30 |
| 5. Example 5 (Water-based adhesive) | 14 | 20 |
| 6. POST-IT TM Tape | 3 | 4 |
| 7. MAGIC TM Transparent Tape | 19 | 28 |
| 8. 95/5 IOA:AA Adhesive (no wax) | 40 | 60 |

TABLE II

SHEAR ADHESION TO PAPER

| Tape - Description | Initial Adhesion (oz/in.) | Heated Adhesion (oz/in.) |
|---|---|---|
| 1. Example 1 | 14 | 17.3 |
| 2. Example 4 | 5 | 28 |
| 3. Example 5 | 20 | na |
| 4. POST-IT TM Tape | 0.1 | 0.2 |

Two wax-modified adhesive tapes of the invention were made. Example 9 was made according to Example 2. Example 10 was made according to Example 5. A comparative Example, 11C, was made according to Example 1 of U.S. Pat. No. 4,783,354 (Fagan). The adhesion of these tapes to paper was tested at time of application or 0 minutes, 10 minutes, 30 minutes, and 60 minutes at room temperature. The data are shown in Table III.

TABLE III

| Example No. | Adhesion (oz/in) | | | |
|---|---|---|---|---|
| | 0 | 10 | 30 | 60 |
| | (Minutes) | | | |
| 9 | 20 | 36 | 57 | 61 |
| 10 | 18 | 21 | 23 | 25 |
| 11C | 8 | 10 | 9 | 9 |

As can be seen from the above data, the wax-modified pressure-sensitive adhesives of the invention built adhesion over time. The wax-containing adhesive of the prior art exhibited no adhesion build.

EXAMPLE 12

The tapes of Examples 10 and 11C were sliced to 40 microns and micrographs were made under 10KX magnification on a scanning electron microscope When the micrographs were observed, the adhesive of the invention showed a formless, regular surface The large areas of adhesure, 11C, of the prior art, showed light domains against a dark background. It is believed that the light domains are the wax which is thus held near the surface, and will not migrate into the substrate as will the wax in the modified adhesive of the invention.

What is claimed is:

1. A pressure-sensitive adhesive composition comprising:
   a) from about 70 parts to about 98 parts of an acrylic copolymer of monomers containing:
      (i) from about 60 to about 99 parts of an alkyl acrylate ester monomer, the alkyl groups of which have an average of 4 to 12 carbon atoms; and
      (ii) from about 1 part to about 40 parts of a monoethylenically unsaturated polar copolymerizable monomer, and
   b) about 0.3 percent to about 7 percent petroleum wax selected from the group consisting of paraffin wax, polypropylene emulsions and polyethylene emulsions to impart repositionable properties to said adhesive, said adhesive also exhibiting latent permanent adhesive properties after contacting a substrate from about 60 minutes to about 120 minutes.

2. A pressure-sensitive adhesive composition according to claim 1 wherein said latent permanent adhesive properties may also be activated by means selected from application of heat or pressure.

3. A pressure-sensitive adhesive composition according to claim 1 comprising from about 0.3% to about 7% of a paraffin wax.

4. A pressure-sensitive adhesive composition according to claim 1 comprising from about 18% to about 50% of a polyethylene emulsion.

5. A pressure-sensitive adhesive composition according to claim 1 wherein said alkyl acrylate ester is selected from the group consisting of isooctyl acrylate, isononyl acrylate, decyl acrylate, dodecyl acrylate, butyl acrylate, ethyl-hexyl acrylate and hexyl acrylate, and said monoethylenically unsaturated polar copolymerizable monomer is selected from the group consisting of acrylic acid, acrylic acid, acrylamide, itaconic acid, hydroxyalkyl acrylates, substituted acrylamides, N-vinyl-2-pyrrolidone, N-vinyl caprolactam, and acrylonitrile.

6. A repositionable pressure-sensitive adhesive according to claim 1 wherein said acrylic copolymer comprises
   a) from about 60 parts to about 80 parts isooctyl acrylate and
   b) correspondingly, from about 40 parts to about 20 parts N-vinyl pyrrolidone.

7. A repositionable pressure-sensitive adhesive according to claim 1 wherein said acrylic polymer comprises
   a) from about 85 parts to about 95 parts isooctyl acrylate and
   b) correspondingly, from about 5 parts to about 15 parts acrylic acid.

8. A repositionable pressure-sensitive adhesive tape comprising the pressure-sensitive adhesive composition of claim 1 and a backing therefor.

9. A repositionable pressure-sensitive adhesive tape comprising the pressure-sensitive adhesive of claim 7 and a backing therefor.

10. A coatable composition comprising the pressure-sensitive adhesive of claim 1 and a liquid vehicle to carry said adhesive.

11. A sheet material coated on at least a portion thereof with the pressure-sensitive adhesive of claim 1.

12. A sheet material according to claim 11 wherein said sheet material is paper.

* * * * *

UNITED STATES PATENT AND TRADEMARK OFFICE
CERTIFICATE OF CORRECTION

PATENT NO. : 5,073,457

DATED : December 17, 1991

INVENTOR(S) : Elmer Blackwell

It is certified that error appears in the above-identified patent and that said Letters Patent is hereby corrected as shown below:

| | |
|---|---|
| Column 6, line 43 | Delete "using 1 2 |
| Column 6, line 44 | After "made" insert --using 1.2-- |
| Column 8 line 39 | After "Table II" and before "Two" insert --Examples 9, 10 and 11C-- |

Signed and Sealed this

Twenty-sixth Day of October, 1993

Attest:

BRUCE LEHMAN

Attesting Officer     Commissioner of Patents and Trademarks